United States Patent [19]
Green et al.

[11] Patent Number: 5,887,924
[45] Date of Patent: Mar. 30, 1999

[54] CARGO HOOK

[76] Inventors: Stephen J. Green, 330 Riverside Road, Abbotsford, Canada, V2S 8B6; Gerald P. Wubs, 5620 Montesina Place, Sardis, Canada, V2R 3NB; James A. Henke, 6053 — 48A Street, Delta, Canada, V4K 1Y7

[21] Appl. No.: 855,571

[22] Filed: May 13, 1997

[51] Int. Cl.$^6$ ....................................................... B66C 1/34
[52] U.S. Cl. ........................ 294/82.33; 294/75; 294/82.26
[58] Field of Search ..................... 294/75, 82.11, 294/82.14, 82.17, 82.19, 82.2, 82.24–82.27, 82.3–82.33, 82.36; 244/137.1, 137.4

[56] References Cited

U.S. PATENT DOCUMENTS

| | | | |
|---|---|---|---|
| 1,242,809 | 10/1917 | Irwin ....................................... | 294/82.33 |
| 2,736,599 | 2/1956 | Coffing ................................... | 294/82.31 |
| 3,032,365 | 5/1962 | Campbell .......................... | 294/82.32 X |
| 3,068,034 | 12/1962 | Campbell ............................... | 294/82.3 |
| 4,998,763 | 3/1991 | Henke .............................. | 294/82.26 X |
| 5,273,333 | 12/1993 | Hatfield et al. ................... | 294/82.26 X |

*Primary Examiner*—Johnny D. Cherry
*Attorney, Agent, or Firm*—Lance A. Turlock

[57] ABSTRACT

A cargo hook for releasably carrying a load includes a support frame, a load support carried by the frame, and a latch. The load support has a closed condition for securing the load and an open condition for permitting release of the load. The latch is for releasably latching the load support in the closed condition and includes a toggle linkage having a first end pivotally connected to the load support, a second end pivotally connected to the frame, and an articulation joint between the ends. Further, the latch includes a mechanism for toggling the toggle linkage between first and second toggle positions, and a catch moveable between a latched position for holding the toggle linkage in the first toggle position and an unlatched position for permitting the toggle linkage to toggle between the first and second toggle positions. The load support may include a static load beam and a load release gate pivotally mounted for rotation between a closed position securing a load on the beam and an open position permitting release of the load from the beam. Alternately, the load support may include a load beam pivotally mounted to the frame for rotation between a closed position securing a load on the beam and an open position permitting release of the load from the beam.

25 Claims, 19 Drawing Sheets

CARGO HOOK

FIELD OF THE INVENTION

The present invention relates to cargo hooks able to releasably carry a load while under load. It is considered particularly adaptable for but not limited to airborne helicopter operations where substantial loads may be lifted and carried beneath a helicopter. In the case of such operations, it is considered particularly adaptable for but not limited to helicopter logging operations.

BACKGROUND TO THE INVENTION

As is noted in U.S. Pat. No. 4,998,763 granted on Mar. 12, 1991, to Henke, there is a need for cargo hooks which can not only secure and carry a load, but which can also quickly and reliably release a load if the need arises. This is particularly so in the case of helicopter logging or similar airborne operations where substantial loads may be lifted and carried beneath helicopters. Typically, a cargo hook will be secured at one end of a long cable (60 to 100 meters, for example), the other end of the cable being secured to the helicopter. In the case of logging operations where the cargo hook may be referred to as a logging hook, several logs collectively weighing several thousand kilograms (3000 to 5000 kg., for example) will in turn be secured to the hook, each by a relatively short length cable (6 to 9 meters, for example).

In the event of a flight emergency, the ability of a cargo hook to rapidly and reliably drop or release a load is obviously critical for the purpose of flight safety. In addition, however, there are certain types of operations where the ability to drop or release a load while the hook is under load may be a standard part of the operation. For example, and again in the case of helicopter logging operations, it is not unusual for a helicopter to be called upon to transport logs from logging site to a location above water where they are deliberately dropped for subsequent recovery and collection in log booms or on boats or scows.

As another example, it will be noted that a pair of cargo hooks may be used in some helicopter logging operations. In such cases, a rigger on the ground will load up the pair of hooks while the helicopter hovers above. The rigger will make an educated guess as to the total weight of the logs but, on occasion, the load may be too heavy for the helicopter to comfortably lift. Not to delay and slacken the load while the rigger removes some logs, the helicopter pilot may prefer to simply release the load carried by one of the hooks and carry off with the load which remains on the other hook. Typically, the pair of cargo hooks used in such operations will be two separately housed hooks mounted on a single frame.

Various cargo hooks have been used for helicopter logging operations. However, the mechanisms for load release are generally subject to very high loads with resulting wear and tear after repeated usage. In the case of the above noted patent to Henke, a design is described which limits the transmission of load forces to the release mechanism. However, particularly in the case of a heavy load such as that presented by a collection of heavy logs, the transmitted forces can remain quite significant in relation to the material strength of components used in the design. Even though the components used in the release mechanism of the Henke design are advantageously limited to components which are in abutment or rolling contact, the high forces which are at play can lead to the development of flat spots which can detract from the smoothness of release and ultimately limit the useful lifetime of the hook.

A primary object of the present invention is to provide a new and improved cargo hook for releasably carrying a load, and which may be structured so as to transmit a minimal amount of the loading force to the release mechanism.

A further object of the present invention is to provide a new and improved cargo hook which is particularly adaptable for carrying heavy loads as in helicopter logging operations.

SUMMARY OF THE INVENTION

In accordance with a broad aspect of the present invention, there is provided a cargo hook for releasably carrying a load, the cargo hook comprising a support frame, load support means carried by the frame, and a latching means. The load support means has a closed condition for securing the load and an open condition for permitting the release of the load. The latching means is for releasably latching the load support means in the closed condition and includes a toggle linkage having a first end pivotally connected to the load support means, a second end pivotally connected to the frame, and an articulation joint between the ends. Further, the latching means includes means for toggling the toggle linkage between first and second toggle positions, and catch means moveable between a latched position for holding the toggle linkage in the first toggle position and an unlatched position for permitting the toggle linkage to toggle between the first and second toggle positions.

With the foregoing structure, the ease of load release is a function of the ease with which the catch can be moved from the latched to an unlatched position. This is in turn a function of the forces transmitted from the load to the catch. The latching means noted above enables a considerable reduction in such forces.

In one embodiment of the invention, the load support means comprises a load beam pivotally mounted to the frame for rotation between a closed position securing the load on the beam and an open position permitting release of the load from the beam (the closed and open conditions of the load support means referred to above now being represented by the closed and open positions of the beam). In this embodiment, the first end of the toggle linkage is connected to the beam. The use of this embodiment is preferably limited to lighter loads because considerable momentum may develop in the load beam and toggle linkage upon the release of heavier loads.

In a preferred embodiment, and particularly for the case of heavy loads, the load support means comprises a static load beam carried by the frame and a load release gate. The load release gate is pivotally mounted for rotation between a closed position securing the load on the beam and an open position permitting release of the load from the beam (the closed and open conditions of the load support means referred to above now being represented by the closed and open positions of the gate). In this embodiment, the first end of the toggle linkage is connected to the gate. Advantageously, the load release gate carries only a relatively small portion of the total weight of the load, the remainder of the weight being carried by the static load beam. The forces transmitted to the catch are correspondingly reduced. In comparison with pivotal movement of an entire load beam as with the previous embodiment, the load release gate may be a relatively small component developing minimal angular momentum as it opens to release a load.

In preferred embodiments, the toggling means comprises first and second lever members, each mounted for rotation about an associated lever axis. The first lever member is connected to the catch means for rotating the catch means between latched and unlatched positions in response to rotation of the first lever member. As well, the first lever member is connected to the second lever member, preferably with a spring, for rotating the second lever member in response to rotation of the first lever member. In turn, the second lever member is connected to the toggle linkage for toggling the toggle linkage between its first and second toggle positions in response to rotation of the second lever member.

Also in preferred embodiments, the latching means includes a follower mounted at the articulation joint of the toggle linkage, the follower having an outwardly facing surface positioned for holding engagement by an inwardly facing surface of the catch means when the toggle linkage is in the first toggle position. Generally, it is contemplated that these surfaces will be cylindrical or cylindrical arc surfaces. To reduce impact forces which may occur between the follower and the catch as the toggle linkage moves from the second toggle position to the first toggle position, the catch may advantageously include a curvate leading edge surface for camming against the surface of the follower.

Various means may be used to actuate a cargo hook designed in accordance with the present invention. In preferred embodiments utilizing the lever mechanism noted above, the actuating means comprises a servo motor mounted to the frame and a linear movement servo arm. The servo arm includes a distal end pivotally connected to the first lever member and has extended and retracted positions controlled by the motor. With such actuating means, the load support means may be powered by the motor to both open and closed conditions.

The foregoing and other features of the invention will now be described with reference to the drawings.

DETAILED DESCRIPTION OF PREFERRED EMBODIMENTS

Figure 1:
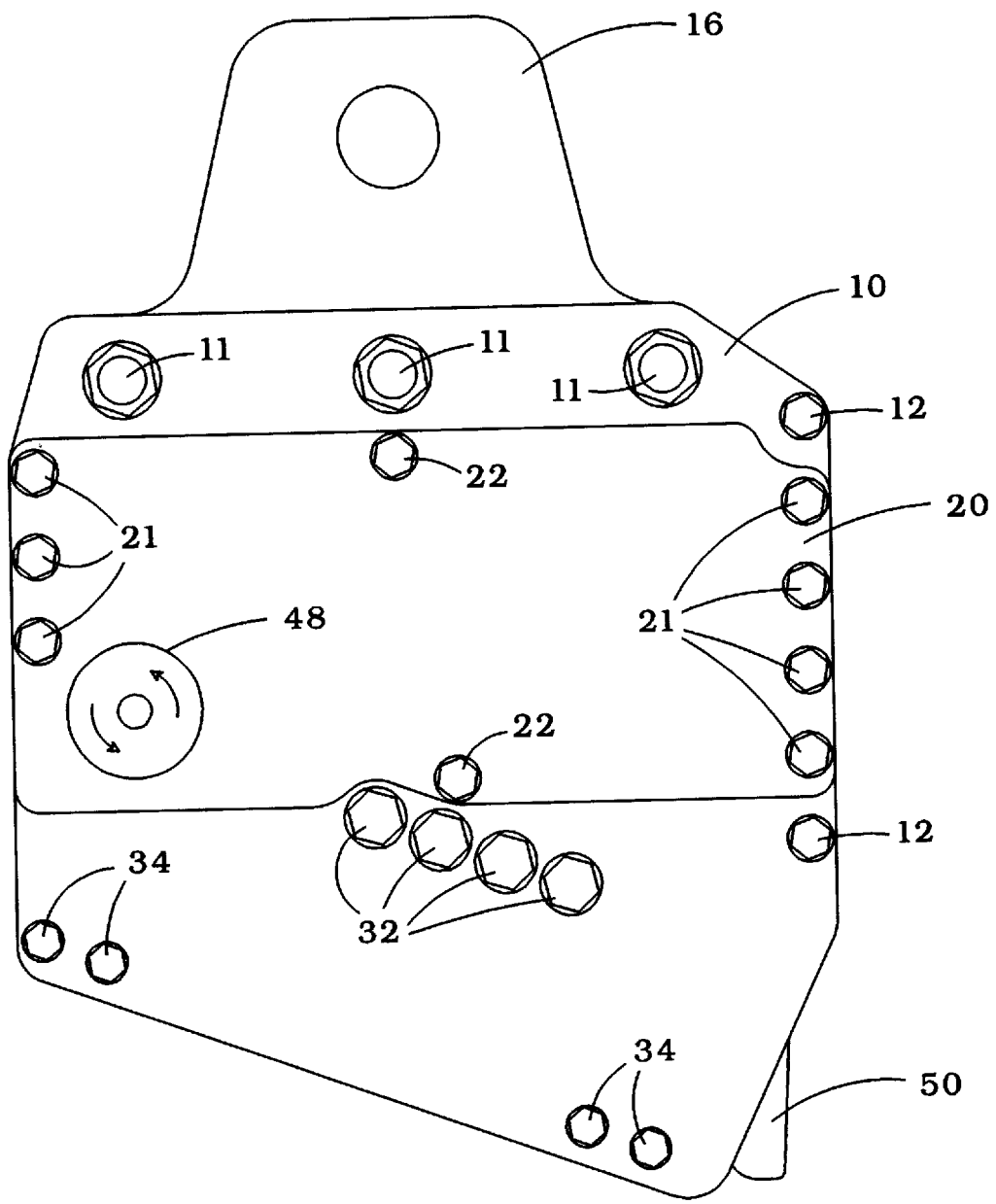
FIG. 1 is a side elevation view of a fully housed cargo hook in accordance with the present invention.

The cargo hook and portions thereof shown in FIGS. 1 to 10 is a dual hook particularly adapted for helicopter logging or other operations which require relatively heavy loads to be lifted. The dual hook includes two independently operable individual hooks generally designated 1, 2 which share a common center plate 5 and a common lift pin 6 (see FIG. 2). Since each individual hook is effectively a mirror image of the other, the following description is substantially limited to one hook only (namely hook 1). Of course, it will be understood that the same description applies mutatis mutandis to hook 2. Hook 1 and hook 2 are each considered to embody the present invention.

Figure 2:
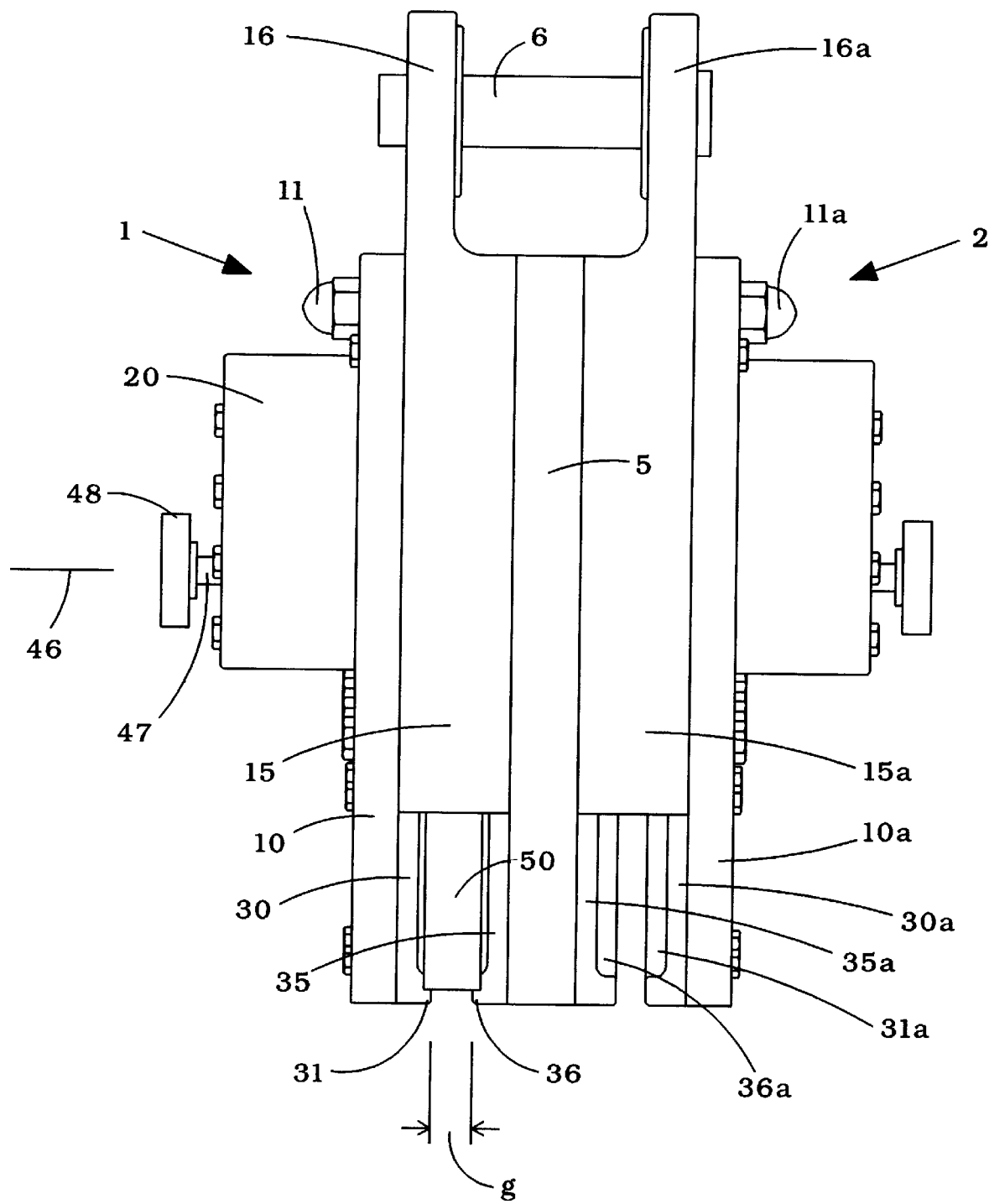
FIG. 2 is a front elevation view of the cargo hook shown in FIG. 1.
Figure 3:
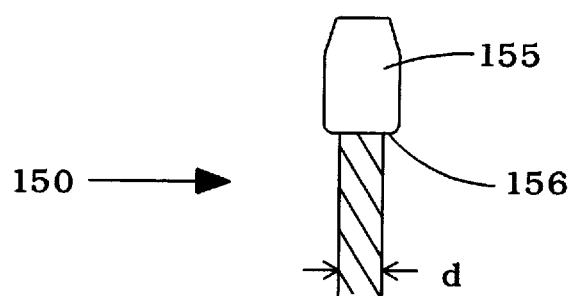
FIG. 3 illustrates a portion of a load cable of the type used with the cargo hook shown in FIG. 1.

In relation to hook 1, and as best seen in FIG. 2, center plate 5 is part of a support frame which also includes an outer plate 10 and a spacer 15. The upper end of spacer 15 includes a flange 16 for receiving one end of lift pin 6; the other end of lift pin 6 being received by a corresponding flange 16a of spacer 15a associated with hook 2. Preferably, the support frame is fabricated from aluminum.

Center plate 5 is secured between outer plate 10 of hook 1 and outer plate 10a of hook 2 by double ended load bearing stud bolts, each end of each bolt being capped with an acorn nut 11, 11a. Non-load bearing screws 12 extend from outer plate 10 and penetrate into center plate 5.

As is described below in more detail, part of the operating mechanism of hook 1 is supported within spacer 15 between outer plate 10 and center plate 5. A further part of the operating mechanism is contained within a cover 20. Cover 20 is mounted on the outside of outer plate 10 utilizing screws 21 which extend from the cover and penetrate into center plate 5 and, as well, utilizing screws 22 which extend from the cover and penetrate into outer plate 10.

Load Support Means

Hook 1 includes a load support means comprising a load release gate 50 and a static load beam formed by a pair of rail structures 30, 35 which slope downwardly at an angle of about 20 degrees in the embodiment shown. Preferably, these components are fabricated from steel.

Rail structures 30, 35 are held together by means of screws 32 (see FIG. 1) which extend from outer plate 10 and penetrate into center plate 5, and by screws 34 (see FIG. 1) which extend from outer plate 10 and penetrate into rail structure 30. The two rail structures are substantially mirror images of each other, and the following description with respect to rail 35 applies equally to rail 30.

A rail 36 is formed along the bottom length of structure 35 (see FIG. 4, 8 or 9) and extends horizontally outward (see FIG. 2) from side wall 37 thereof. An upper flange 38 extends horizontally outward from the top of wall 37. The horizontally outermost face of flange 38 is in abutment with the horizontally outermost face of the corresponding upper flange (not shown) of structure 30. As shown in FIG. 2, there is a gap "g" between the outermost edge of rail 36 and the outermost edge of corresponding rail 31 of rail structure 30. Gap "g" is sufficiently wide to accommodate the wire diameter "d" of a standard load cable such as load cable 150 shown in FIG. 3. At the same time, and continuing with reference to FIGS. 2 and 3, gap "g" is sufficiently narrow to engage the underside 156 of the larger diameter ferruled end 155 of cable 150.

In FIG. 2, the load release gate of hook 2 corresponding to load release gate 50 of hook 1 has been removed to illustrate the rail structures of the hook in somewhat more detail when viewed from the front end. Rail structures 301a and 35a with rails 31a and 36a, all of hook 2, correspond to rail structures 30 and 35 with rails 31 and 36 of hook 1.

When hook 1 is assembled, the load beam provides a downwardly sloping channel along the length of rail structures 30, 35 in the region above rails 31, 36, below flange 38 of structure 35 and the corresponding opposed flange (not shown) of structure 30, and between side wall 37 of structure 35 and the corresponding opposed side wall of structure 30. Apart from keeper 45 and gate 50 which are discussed below and which serve to controllably block the channel, the channel is open longitudinally from end 40 to end 41 of the load beam. The channel is sized to accommodate the ferruled ends of several load cables such as load cable 150 which are received one-by-one through end 40—the wire portions of such cables extending downwardly through gap "g" between rails 31, 36. It may be noted from FIGS. 4, 8 and 9 that end 40 is slightly flared. This permits a rigger to more easily direct the ferruled ends of load cables into the channel when loading the hook.

Figure 4:
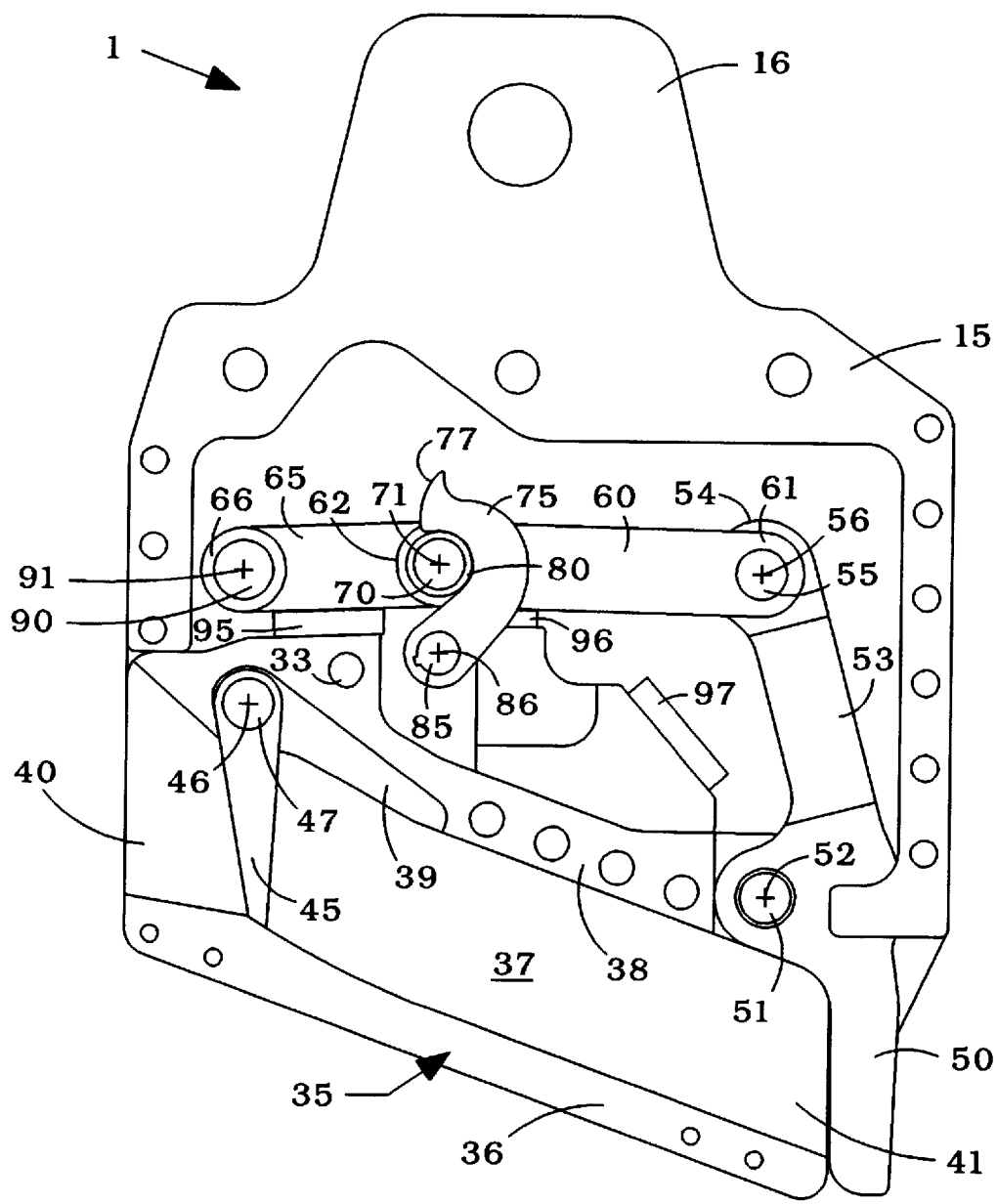
FIG. 4 is a side elevation view particularly illustrating a portion of the latching means and load support means within the cargo hook of FIG. I when the mechanism is in position for receiving and carrying a load.
Figure 5:
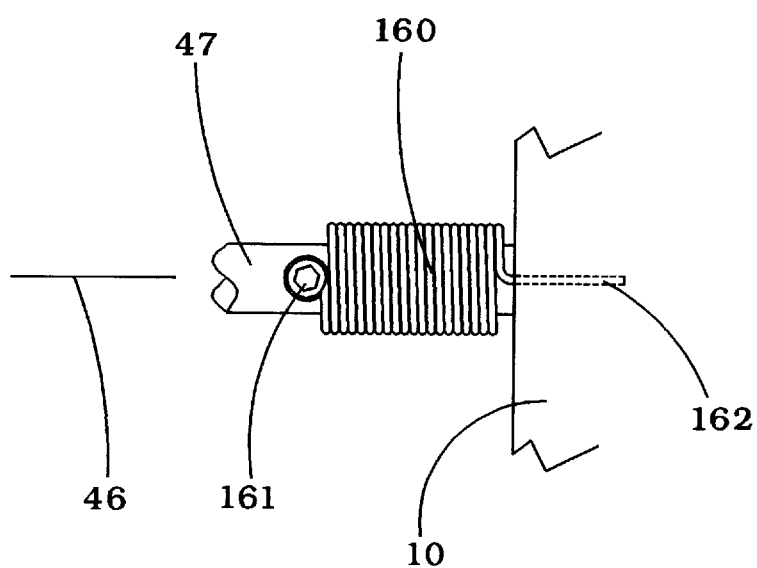
FIG. 5 is a front elevation view illustrating a portion of a load cable keeper mechanism within the cargo hook shown in FIG. 1
Figure 8:
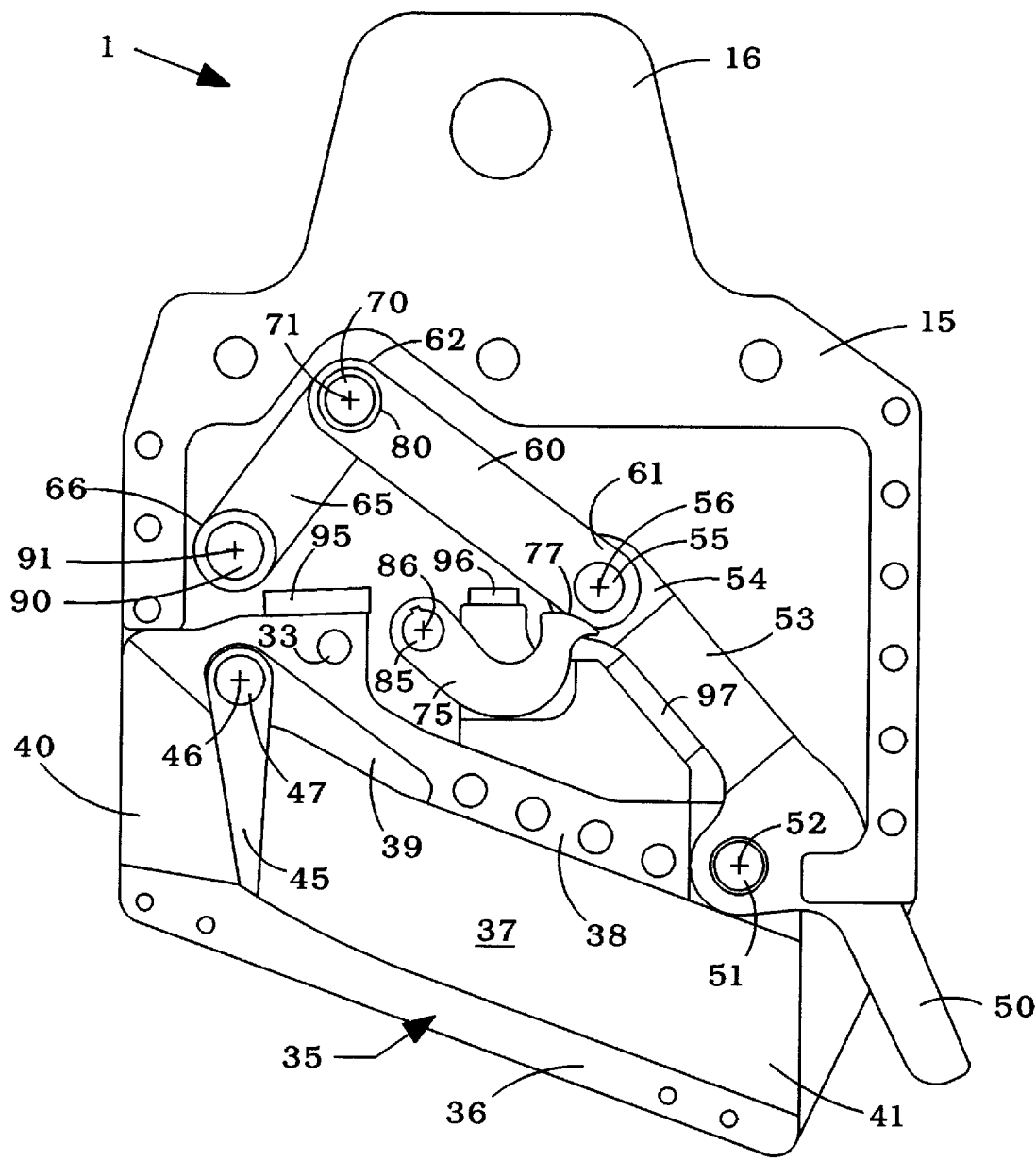
FIG. 8 is a side elevation view particularly illustrating that portion of the operating mechanism shown in FIG. 4 when the mechanism is in a load release position.
Figure 9:
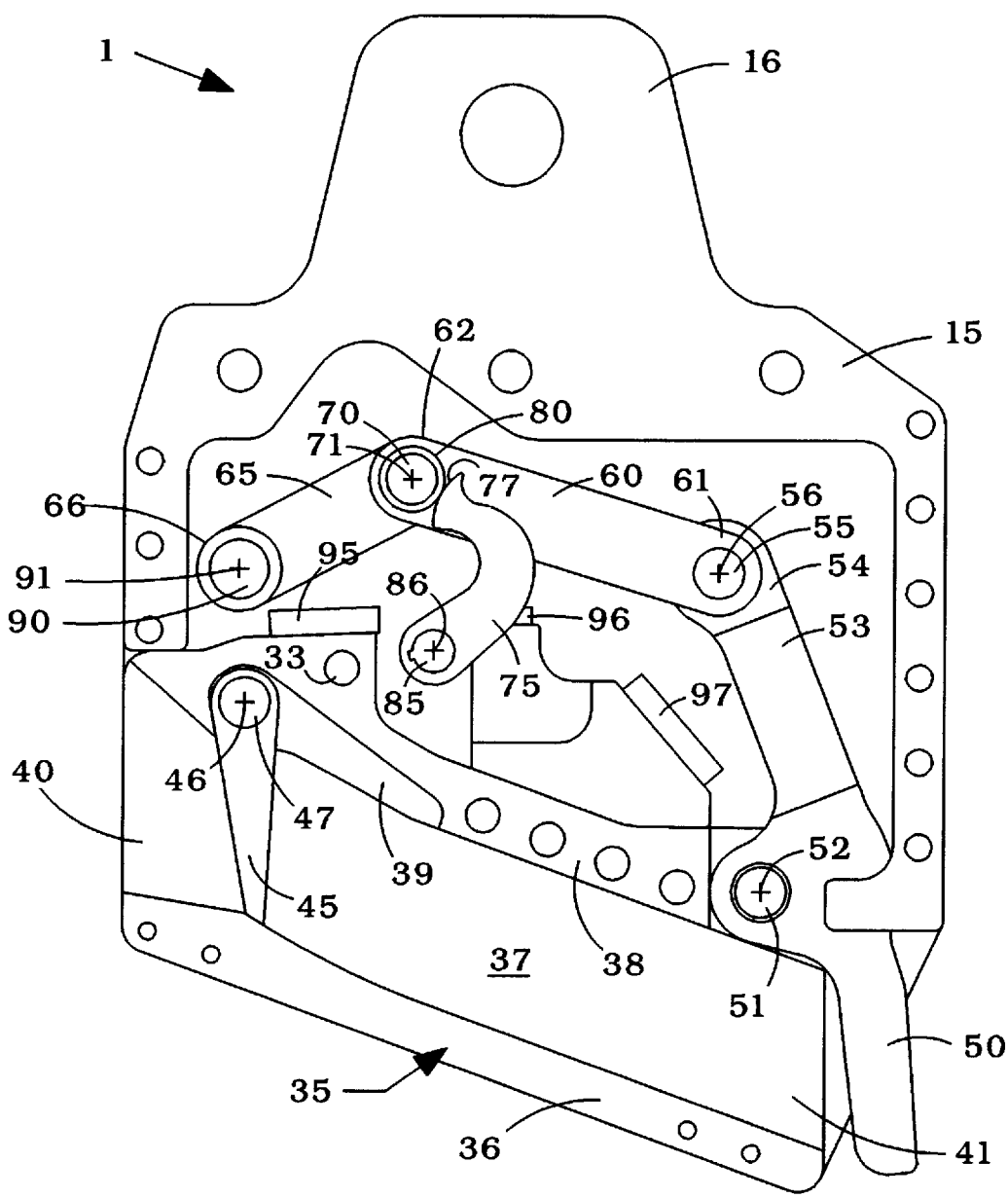
FIG. 9 is a side elevation view particularly illustrating that portion of the operating mechanism shown in FIG. 4 when the mechanism is in an intermediate position resetting from a load release position to a load receiving position.

As can be seen in FIGS. 4, 8 and 9, flange 38 of rail structure 35 includes a recess 39. A corresponding recess appears in the corresponding flange of rail structure 30. The combined recess formed by the recesses in both structures is sized to rotationally receive a load cable keeper 45 which is pivotally mounted for rotation about axis 46 between a normally closed position illustrated in the drawings and an open position where the keeper nests in the combined recess. Keeper 45 is mounted on a shaft 47, portions of which shaft are also shown in FIG. 2 and 5. Between the open and closed positions, the keeper with the shaft is rotatable about axis 46 to permit the load beam to be loaded through end 40. But, it subsequently returns to the closed position once the beam is loaded. Normally, such rotation would occur simply under the weight of keeper 45 when hook 1 is static and in the upright position shown in FIG. 4. However, to avoid unwanted movement at other times, the keeper mechanism is biased to the closed position. More particularly, and as best illustrated in FIG. 5, keeper 45 is biased to the closed position by a spring 160 coiled around shaft 47 from a first end secured to the shaft by a cap screw 161 to a second end 162 loosely fitted in a hole in outer plate 10. (Spring 160 appears in smaller detail in FIGS. 10 and 11).

Once the beam is loaded, it cannot be unloaded through end 40 except by overcoming the bias of spring 160 and manually rotating keeper 45 to its open position. Knob 48 attached to the end of shaft 47 (see FIG. 1) facilitates this purpose. Note that it is not contemplated that knob 48 should be used to open the keeper for the purpose of receiving a load. In this regard, the forward motion of the ferruled end of a load cable is sufficient to rotate keeper 45 to its open position when the ferruled end is passed through end 40 by a rigger with sufficient force to overcome the relatively small bias presented by spring 160.

Keeper 45 and its related structure are not considered essential. However, it does serve as a safety feature acknowledging the possibility that a load might inadvertently slip back through end 40. On rare occasions, it is contemplated that a rigger might wish to unload or partially unload the load beam through end 40. Obviously, it is contemplated that the load cables would be slack on any such occasion.

Gate 50 is pivotally mounted on a dowel 51 for rotation about axis 52 between a closed position as shown in FIG. 4 and an open position as shown in FIG. 8. Dowel 51 is press fitted in center plate 5 and extends from a blind hole (not shown) in outer plate 10, through center plate 5, and to a corresponding blind hole (not shown) in outer plate 10a of hook 2. Here, it will be noted that a second press fitted dowel 33 similarly extends from a blind hole in outer plate 10, through center plate 5, and to a corresponding blind hole in outer plate 10a of hook 2. Dowels 33 and 51 provide primary support in shear for rail structures 30, 35.

In the closed position, gate 50 blocks end 41 of the load beam and thereby serves to secure a load on the beam. In the open position, it permits release of the load from the beam through end 41. In FIG. 8, it will be noted that extension arm 53 of gate 50 is abutted against a stop 97. This stop is fabricated from a resilient material such as urethane and serves to limit the opening movement of the gate and to absorb energy from that movement.

Latching Means

Hook 1 also includes a latching means for releasably latching load release gate 50 in its closed position. As appears more completely in FIG. 7 which is a top view of the latching means shown in FIG. 4, the latching means includes a toggle linkage comprising a toggle arm 60 extending from a first pair of end coupling flanges 61, 61' to a second pair of end coupling flanges 62, 62', and a toggle arm 65 extending from a coupling flange 67 at one end to a coupling sleeve 66 at an opposed end. Coupling flanges 61, 61' may also be regarded as representing a first end of the toggle linkage. Similarly, coupling sleeve 66 may be regarded as representing a second end of the toggle linkage.

Toggle arms 60, 65 are coupled by a pin 70 (see FIGS. 4, 8 and 9) which serves as an articulation joint between ends 61, 61' and 66 of the toggle linkage. The axis of coupling or articulation is indicated by axis 71. End 61, 61' is pivotally coupled by a pin 55 to upper end 54 of extension arm 53 of gate 50. Pin 55 also serves as an articulation joint, the axis of coupling or articulation being indicated by axis 56. End 66 is pivotally connected to the frame of hook 1 by a shaft 90 which is mounted between center plate 5 and outer plate 10 and is rotatable about axis 91.

The latching means further includes a toggling means described below in more detail for toggling the toggle linkage between a first toggle position as illustrated in FIG. 4 and a second toggle position as illustrated in FIG. 8. FIG. 9 illustrates a transitional position. As can be seen, gate 50 is closed when the linkage is in the first toggle position (FIG. 4) and open when the linkage is in the second toggle position (FIG. 8).

In FIG. 4, it will be noted that toggle arm 60 is abutted against a stop 96. Likewise, toggle arm 65 is abutted against a stop 95. As in the case of stop 97, stops 95, 96 are fabricated from a resilient material such as urethane. When the toggle linkage returns from the second toggle position to the first toggle position in the manner described below, stop 96 serves to limit the downward movement of toggle arm 60 and to absorb energy from that movement. Similarly, stop 95 serves to limit the downward movement of toggle arm 65 and to absorb energy from that movement.

In addition, the latching means includes a catch 75 moveable between a latched position as shown in FIG. 4 which holds the toggle linkage in the first toggle position and unlatched positions as shown in FIGS. 8 and 9 permitting the linkage to toggle between the first and second toggle positions. For movement between its latched and unlatched positions, catch 75 is keyed to a shaft 85 for rotation with the shaft about axis 86. Shaft 85 is itself mounted between center plate 5 and outer plate 10.

Figure 6:
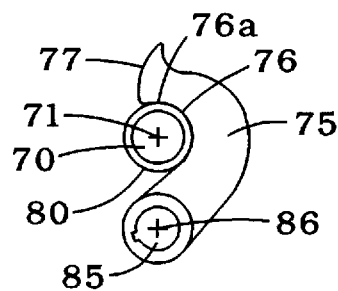
FIG. 6 illustrates in more detail a catch forming part of the latching means shown in FIG. 4.

More particularly, and as is partially shown on a somewhat larger scale in FIG. 6, catch 75 serves to hold the toggle linkage in the first toggle position with its inwardly facing surface 76 engaging the outwardly facing surface of a cylindrical follower 80. Follower 80 is mounted and freely rotates on pin 70 about axis 71 at the articulation joint of the toggle linkage. The details of the follower mounting on pin 70 appear only in FIG. 7. As shown, follower 80 is secured on the pin by a retainer or shoulder 83 with a washer 81 (preferably Teflon) between the retainer and the follower. Concurrently, it is held away from toggle arm 60 by a spacer 82 and another washer 81.

Referring to FIG. 6, it will be noted that inwardly facing surface 76 is generally arc-shaped, but an initial portion thereof has been designated 76a. The reason is to highlight the fact that while surface 76 is generally curvate, portion 76a has a different curvate characteristic. More particularly, axes 71 and 86 are in vertical alignment in the present embodiment when hook 1 is in its upright position. With an added allowance of about 0.0125 cm., the radius of curvature of surface 76 measured to axis 71 generally corresponds to the surface radius of follower 80, but only until an alignment point lying vertically above axes 71 and 86. Thereafter, surface 76 extends past the vertical (counterclockwise in FIG. 6) as surface 76a for a small angle (about 8 degrees in the present embodiment) but with a radius of curvature measured to axis 86 rather than axis 71. In effect, the extension represented by surface 76a thus provides a dwell angle which must be transited before follower 80 can be completely released by catch 75. This feature is considered desirable to lessen the probability that the catch will slip from the follower with small clockwise rotations that might be caused by shock or vibration.

Continuing with reference to FIG. 6, it will also be noted that catch 75 includes a curvate leading edge surface 77. As best indicated in FIG. 9 which illustrates the toggle linkage and the catch at a transitional point when the linkage is returning from its second position (viz. where gate 50 is open) to its first position (viz. where gate 50 is closed), surface 77 is in contact with the surface of follower 80. At this point, catch 75 is tending to rotate counterclockwise to its latching position while follower 80 is moving downwardly. The curvature of surface 77 allows catch 75 to cam backwardly against the follower and serves to reduce the sharpness of impact or deflection forces which may otherwise occur between these elements during the return process.

Figure 7:
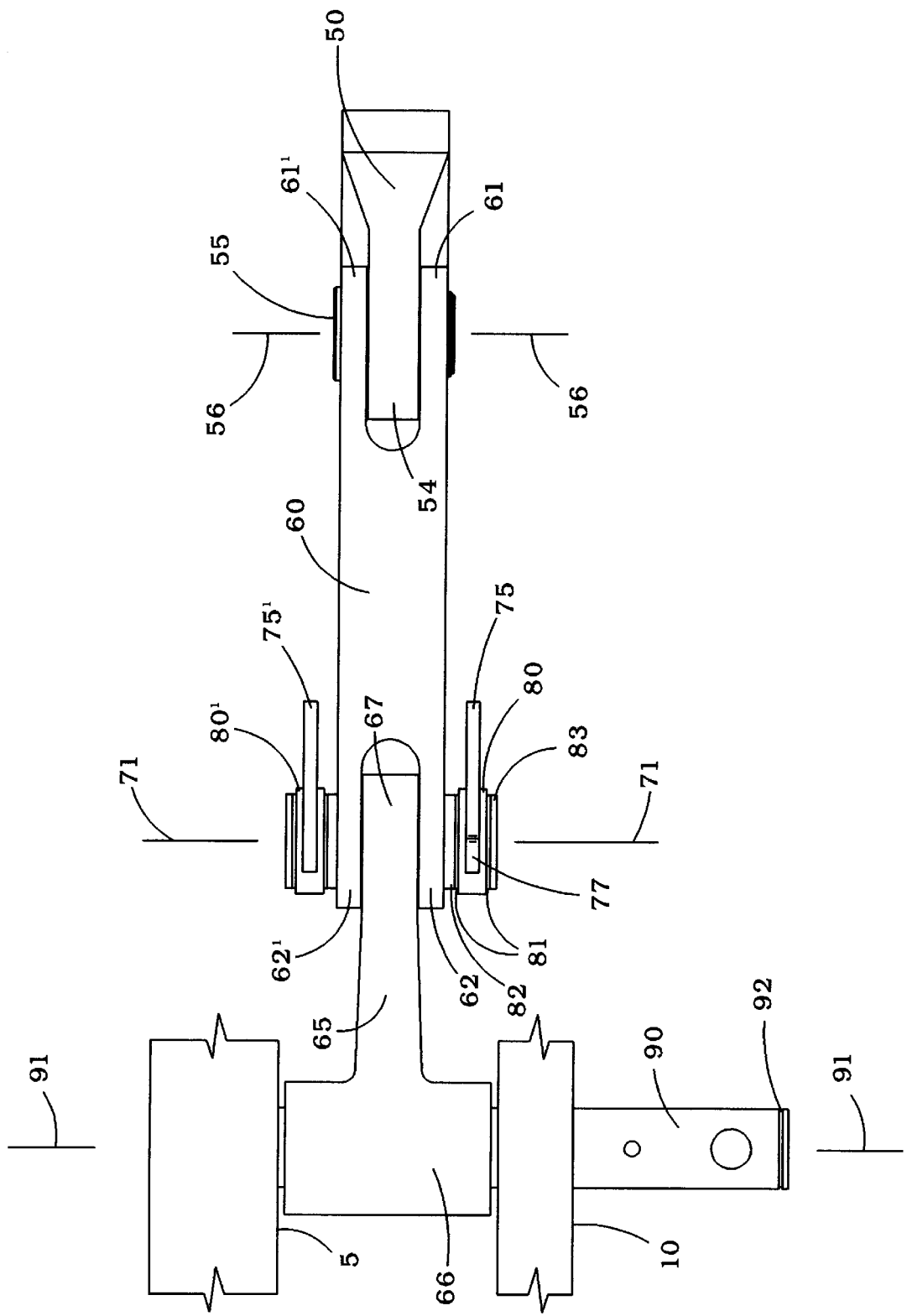
FIG. 7 is a top view of a the latching means shown in FIG. 4.

As depicted in FIG. 7, there are actually two catches 75, 75' used in the design of cargo hook 1. Likewise, there are actually two followers 80, 80'. Follower 80' is secured on pin 70 in the same manner as follower 80 and is basically identical to follower 80. Catch 75' is secured on shaft 85 in the same manner as catch 75 and is basically identical to catch 75 but for the absence of a leading edge surface corresponding to surface 77 of catch 75. The catches 75, 75' and related followers 80, 80' operate in tandem on either side of the toggle linkage and as such serve to balance the forces acting on the linkage. Catch 75' does not include a leading edge surface because it will be rotated backwardly with shaft 85 when catch 75 is cammed backwardly.

When the toggle linkage is in its first toggle position as illustrated in FIG. 4, the points of axes 56, 71 and 91 as shown in the figure do not lie in a straight line. Rather, if an imaginary straight line was drawn between the point of axis 56 and the point of axis 91, then the point of axis 71 would lie a short distance (preferably very short) above the drawn line. Thus, when a force is transmitted to the linkage from a load acting on gate 50, the articulation joint at pin 70 tends to be driven or folded upwardly rather than downwardly. Any significant upward motion is of course restrained by catches 75, 75' bearing against followers 80, 80'. But, the forces transmitted to the catches which provide such restraint are very much less than the force of the load on gate 50. In this regard, and as will be readily determinable by any person skilled in the art, the forces transmitted to catches 75, 75' will generally be a function of the weight of the load, the downward slope and frictional characteristics of rail structures 30, 35 which will determine what portion of that weight is carried as a force acting on gate 50, the relative length of extension arm 53 (which preferably represents more than ½ the length of gate 50 as a whole thereby achieving a mechanical moment arm advantage around gate axis 52), the relative lengths of toggle arms 60, 65, and the distance which the point of axis 71 lies above the imaginary straight line between the point of axis 56 and the point of axis 91. In one implementation of the present embodiment, the forces transmitted to catches 75, 75' from a load carried by the hook are less than 3% of the load force acting on gate 50. Of course, such reduced forces greatly facilitate the ease with which the catches can be unlatched for the purpose of releasing the load.

Figure 10:
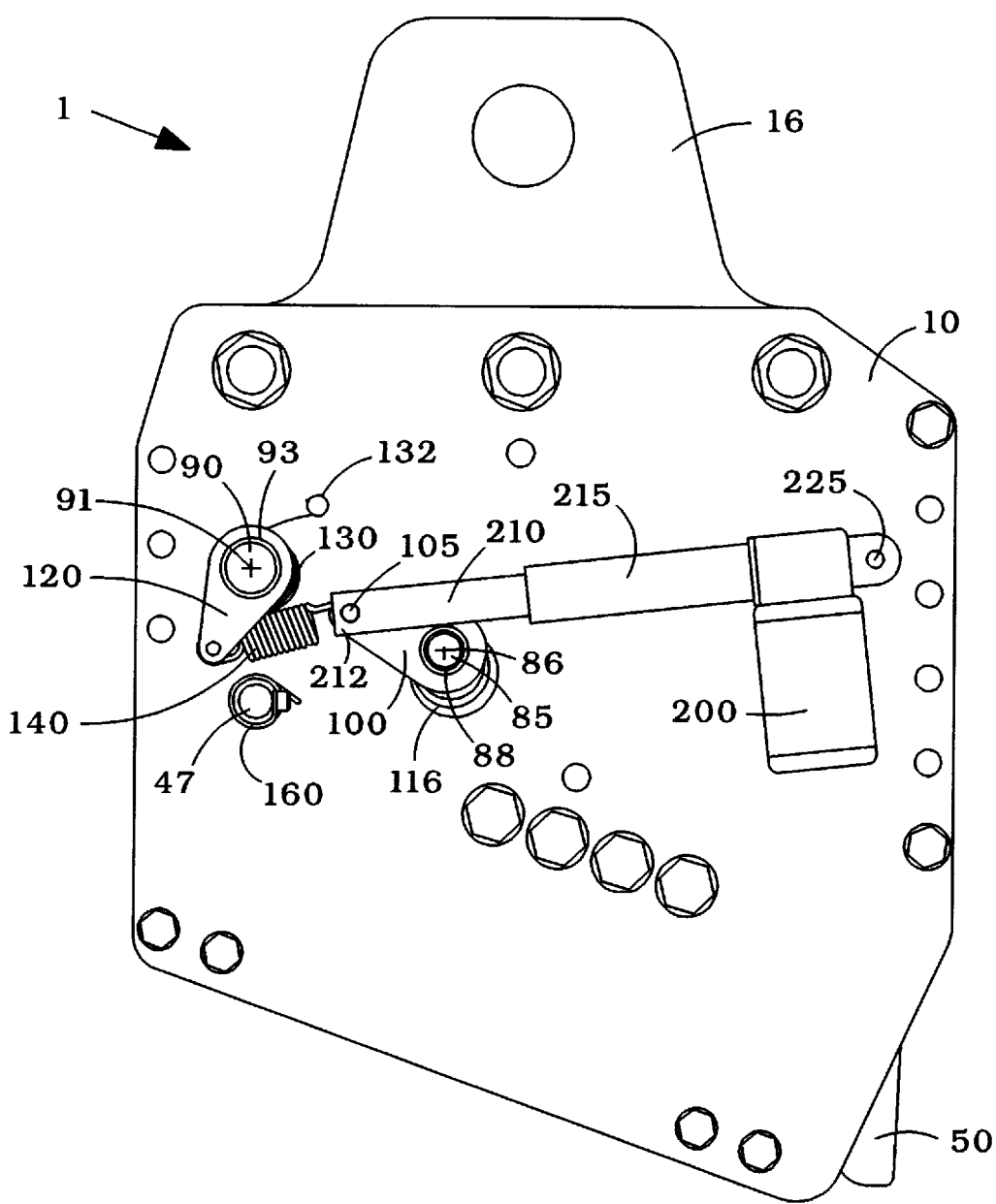
FIG. 10 is a side elevation view particularly illustrating a further portion of the latching means within the cargo hook of FIG. 1 when the mechanism is in position for receiving and carrying a load.
Figure 11:
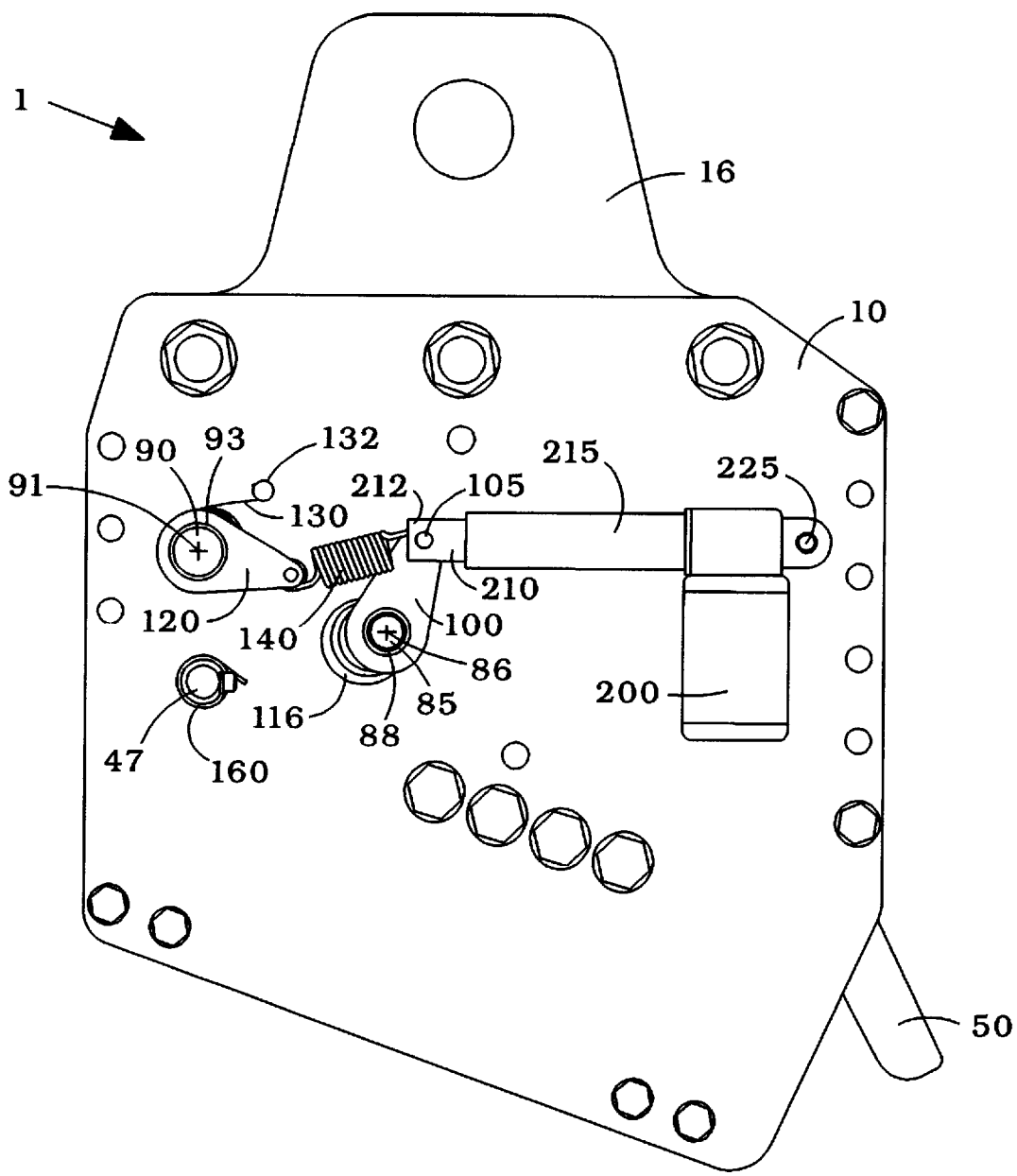
FIG. 11 is a side elevation view particularly illustrating that portion of the operating mechanism shown in FIG. 10 when the mechanism is in position for releasing a load.

The toggling means referred to above, and which controls the operation of the toggle linkage, is best illustrated in FIGS. 10 and 11. FIG. 10 illustrates components of the toggling means when the toggle linkage is in the first toggle position. FIG. 11 illustrates the same components when the toggle linkage is in the second toggle position. As can be seen, the toggling means includes a first lever member 100, a second lever member 120, and a spring 140 forming part of a link between the two members. Spring 140 is relaxed in the position shown in FIG. 10 and in tension in the position shown in FIG. 11.

Figure 13:
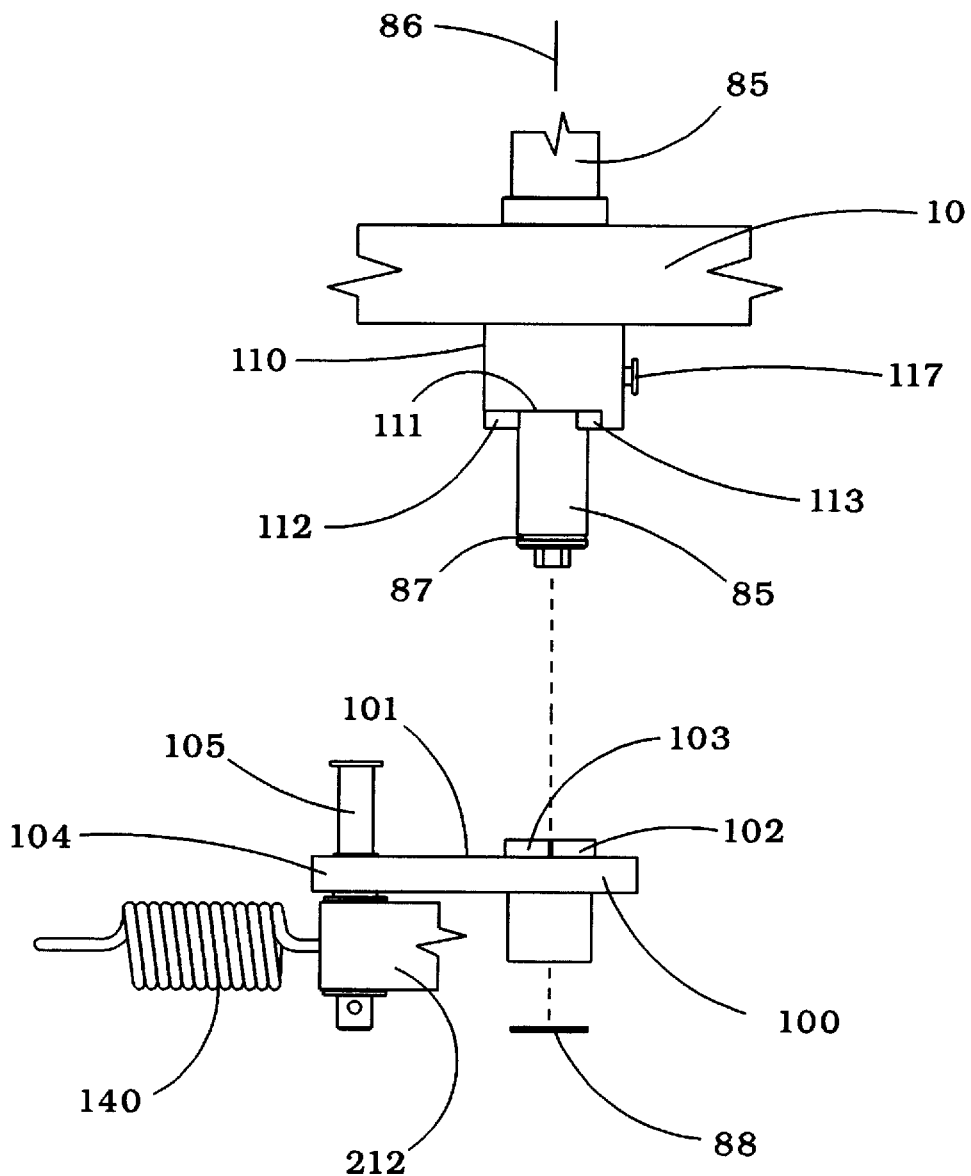
FIG. 13 is a partially exploded top view illustrating the mounting of the lever component as shown in FIG. 12.

Lever member 100 is mounted for rotation on shaft 85 which is positioned to engage a collar 110 (see FIGS. 13 and 14) in the course of such rotation. As indicated in FIG. 13, the lever member is retained on the shaft by a ring 88 which snaps fits in groove 87 on shaft 85 after the lever member has been fitted on the shaft.

Figure 12:
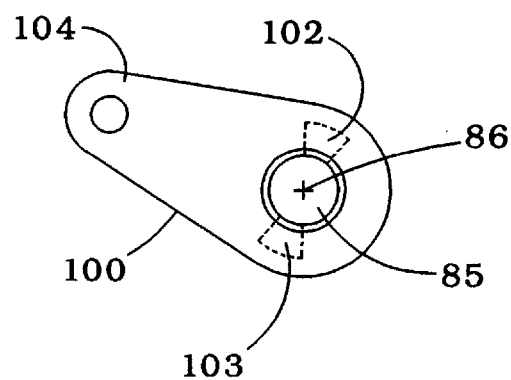
FIG. 12 illustrates in more detail a lever component as shown in FIG. 10.

Collar 110 forms part of a clutch mechanism for lever member 100 and is keyed to shaft 85 which extends through outer plate 10. A ball bearing (not shown) is inset in plate 10 to support the shaft. In more detail, it will be noted from FIGS. 12 and 13 that lever member 100 includes a pair of radially extending tabs 102, 103 which protrude from its back surface 101. Likewise, from FIGS. 13 and 14 it will be noted that collar 110 includes a pair of radially extending tabs 112, 113 which protrude from its end 111. When lever member 100 is mounted on shaft 85, tabs 102, 103 project into the angular regions 114, 115 between tabs 112, 113. So long as tabs 102, 103 do not angularly abut against tabs 112, 113, lever member 100 is generally free to rotate on shaft 85 without forcing the shaft to rotate a corresponding amount. Thereafter, lever member 100 and collar 110 will be fully engaged and continued rotation of the lever member will rotate shaft 85 an equal amount.

Figure 14:
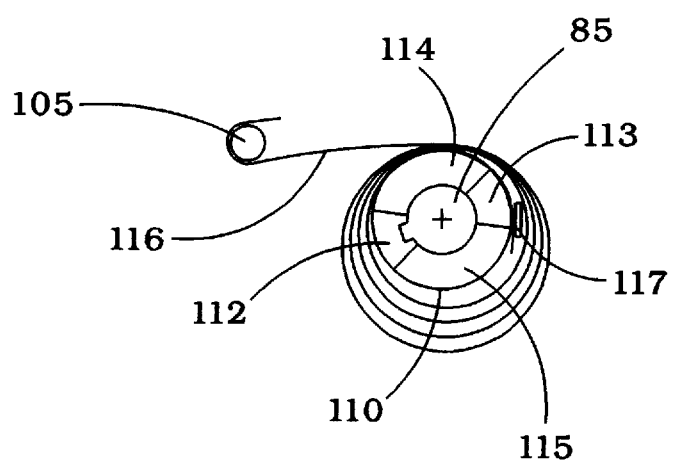
FIG. 14 is an end view, partly schematic, of a collar and clutch spring mechanism associated with the lever component as shown in FIG. 12.

In addition to collar 110, the clutch mechanism associated with lever member 100 includes a spiral wound band or clock spring 116 which, as depicted in FIG. 14, is connected at its inner spiral end to collar 110 by a pin 117 and at its outer spiral end to lever 100 by a rod 105, the latter of which is mounted transversely (see FIG. 13) through the leveraging end 104 of lever 100. (Note that for the purpose of more clearly showing the elements that are depicted in FIG. 13, spring 116 is not depicted in FIG. 13).

Lever member 120 is mounted for rotation on shaft 90 to which end 66 of the toggle linkage is also connected. The lever member is retained on the shaft by a ring 93 (see FIG. 16) which snaps fits in a groove 92 (see FIG. 7) on shaft 90.

Figure 15:
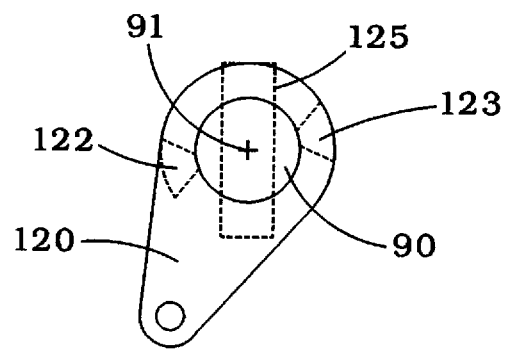
FIG. 15 illustrates in more detail another lever component as shown in FIG. 10.
Figure 16:
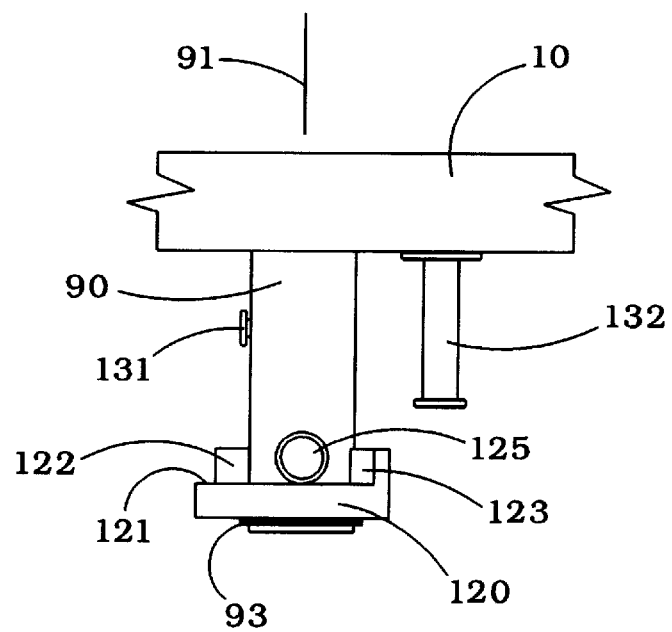
FIG. 16 is a top view illustrating the mounting of the lever component as shown in FIG. 15.
Figure 17:
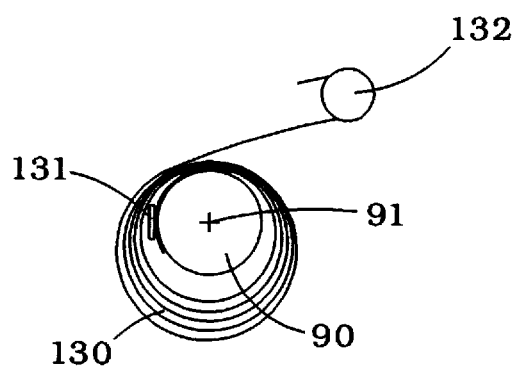
FIG. 17 is an end view, partly schematic, of a clutch spring mechanism associated with the lever component as shown in FIG. 15.

As will be best understood from FIGS. 16 and 17, lever member 120 is positioned to engage a pin 125 which is mounted transversely through shaft 90 and forms part of a clutch mechanism for the lever member. In more detail, it will be noted from FIGS. 15 and 16 that lever member 120 includes a pair of radially extending tabs 122, 123 which protrude from its back surface 121. When lever member 120 is mounted on shaft 90, and as best seen in FIG. 16, tabs 122, 123 then project on either side of pin 125. So long as these tabs do not angularly abut pin 125, lever member 120 is generally free to rotate on shaft 90 without forcing the shaft to rotate a corresponding amount. Thereafter, lever member 120 and pin 125 will be fully engaged and continued rotation of the lever member will rotate shaft 90 an equal amount.

In addition to pin 125, the clutch mechanism associated with lever member 120 includes a spiral wound band or clock spring 130 which, as depicted in FIG. 17, is connected at its inner spiral end to shaft 90 by a pin 131 and at its outer spiral end to a dowel 132. Dowel 132 is threaded into plate 10 as shown in FIG. 16, and extends outwardly therefrom in parallel with shaft 90. (Note that for the purpose of more clearly showing the elements that are depicted in FIG. 16, spring 130 is not depicted in FIG. 16.)

Actuating Means

Hook 1 further includes an actuating means connected to the latching means described above for opening and closing the load support means described above. More particularly, and as can best be seen in FIGS. 10 and 11, such actuating means comprises a servo motor 200 and a linear movement servo arm 210. Servo arm 210 is tubular. Distal end 212 of the arm is pivotally connected to lever member 100 by pivotal connection with rod 105 which in turn connects with leveraging end 104 of the lever member (see also FIG. 13. Note that spring 140 loops around rod 105 within end 212 of the arm).

The position of servo arm 210 is controlled by servo motor 200 between an extended position from housing 215 as shown in FIG. 10 and a retracted position as shown in FIG. 11. In order to permit the arm to stroke between the extended and retracted positions while it is connected with lever member 100, the actuating means is pivotally mounted on a dowel 225 which extends horizontally outward from outer plate 10.

Servo motor 200 and servo arm 210 are a conventional DC servo motor—servo arm combination wherein the servo arm is driven to an extended or a retracted position depending upon the polarity of a working input voltage fed by wires (not shown) to the motor from an external DC source. The stroke of the servo arm is preferably free wheeling at the end of its stroke in extended or retracted positions so as to avoid the need for external limit switches. For the present embodiment which is particularly adapted for helicopter logging operations, it is contemplated that the working voltage would normally be about 24 to 28 VDC as is often available from the DC power bus of helicopters. The voltage polarity as seen by motor 200 can be manually controlled by a conventional switching means in the helicopter, with appropriate wiring leading from the helicopter down to motor 200 in hook 1.

Operation

In operation, the cargo hook shown in the preceding figures typically will be slung by pin 6 at the end of a long line cable (e.g. 60 to 100 meters in length) extending down from a helicopter. With the components of hook 1 in the positions shown in FIGS. 4 and 10, a rigger on the ground will then introduce a load (e.g. logs) to the hook with the use of one or more short line load cables (e.g. cable such as cable 150, each 6 to 9 meters in length). The load cables themselves thus become part of the load.

As described above, the load cables are introduced one-by-one through end 40 of the load beam. When the hook is subsequently lifted by the helicopter, the cables become taut with the weight of the load bearing not only on rails 31, 36 but also against gate 50, the latter of which is held in position shown in FIGS. 4 and 10 by the action of catches 75, 75' as described above. At this point, the following initial conditions may be observed:

Spring 116 associated with lever member 100 and spring 130 associated with lever member 120 are each maximally unwound.

Tabs 102, 103 of lever member 100 are in abutment contact with tabs 112, 113 of collar 110 such that shaft 85 will rotate immediately upon clockwise rotation of lever member 100.

Tabs 122, 123 of lever member 120 are angularly spaced away from pin 125 on shaft 90 such that lever member 120 can begin to rotate without immediately rotating shaft 90.

Spring 140 connecting lever member 100 to lever member 120 is relaxed.

Due to the action of the load, the toggle linkage through followers 80, 80' is bearing upwardly against catches 75, 75'

Load release is achieved by operating servo motor 200 to retract servo arm 210 from the extended position shown in FIG. 10 to the retracted position shown in FIG. 11. During this transition, the following events occur:

As servo arm 210 begins to retract, it begins to rotate lever member 100 clockwise. Concurrently shaft 85 begins to rotate clockwise. Catches 75, 75' rotate clockwise with shaft 85.

Immediate load release does not occur. As noted above, surface 76a of catch 75 provides a small dwell angle which must be transited before follower 80 can be completely released by catch 75. The same applies as between catch 75' and follower 80'. The toggle linkage through followers 80, 80' continues to bear upwardly against the catches.

When the tips of catches 75, 75' have been rotated clockwise beyond the top centers of followers 80, 80', the contact slope between the catches and the followers permits the followers to begin to slip upwardly against the catches.

Meanwhile, and from the outset of the clockwise rotation of lever member 100, lever member 120 has been rotating counterclockwise (drawn by spring 140 as lever member 100 rotates). At this stage where only the small dwell angle associated with catches 75, 75 has been transited, tabs 122, 123 of lever member 120 remain angularly spaced away from pin 125 on shaft 90. In the present embodiment, about 30 degrees of rotation is required before tabs 122, 123 move into abutment contact with pin 125.

When followers 80, 80' are in a position to begin to slip upwardly against catches 75, 75', substantial rotational energy may be imparted to the catches by the followers. This assumes that the load on hook 1 and the corresponding force transmitted to gate 50 is itself substantial. In the result, the catches may be rotated to a fully unlatched position by the action of the followers more quickly than by the action of servo arm 210 on lever member 100. In such circumstances, catches 75, 75', shaft 85 and collar 110 rotate ahead of lever member 100. As a consequence, tabs 112, 113 of collar 110 move ahead of contact with tabs 102, 103 of lever member 100 and spring 116 begins to wind up. However, once the catches lose contact with the followers and the rotational energy imparted to them has been fully absorbed by spring 116, then spring 116 immediately rotates the catches back until tabs 102, 103 are again in abutment contact with tabs 112, 113.

In the case of lighter loads, or in the case of no load, catches 75, 75 will be rotated to the fully unlatched position at a speed completely determined by the continuing action of servo arm 210 on lever member 100. In this case, tabs 102, 103 of lever member 100 remain in abutment contact with tabs 112, 113 of collar 110 at all times and spring 116 remains unwound.

Load release occurs when gate 50 is sufficiently open to permit the ferruled ends of load cables such as load cable 150 to slip under the weight of the load from the load beam through end 41. Such slippage results from the downward slope of the beam which, as noted above, is about 20 degrees in the embodiment shown. In practice, the slope with respect to ground will normally be even greater because the balance of a typical load below lift pin 6 will be somewhat off center towards gate 50.

Subsequent to load release, the components of hook I will be in the positions shown in FIGS. 8 and 11. Spring 116 will be unwound and spring 130 will be maximally wound. The hook is then reset by operating servo motor 200 to extend servo arm 210 from the retracted position shown in FIG. 11 to the extended position shown in FIG. 10. During this transition, the following events will typically occur As servo arm 210 begins to extend, lever member 100 is driven counterclockwise. Through the action of spring 116 (now tending to wind) on collar 110, shaft 85 with and catches 75, 75' likewise begin to rotate counterclockwise.

As lever member 100 is driven counterclockwise, lever member 120 is concurrently driven clockwise. In this regard, it may be noted that the angular speed of lever member 120 is essentially determined by the rate of extension of servo arm 210. Despite the fact that spring 140 connecting lever members 100 and 120 is in tension at this stage, its purpose is not to effect the normal operation of the hook. Rather, the essential purpose of spring 140 is to shield the servo arm from shock or impact forces that might be transmitted from the toggle linkage. In principle, spring 140 could otherwise be replaced by a rigid link.

With the clockwise rotation of lever member 120, there is corresponding rotation of shaft 90 and the toggle linkage begins to return from the position shown in FIG. 8 to the position shown in FIG. 4.

During the return process, it is possible for the toggle linkage to meet catch 75 in the manner shown in FIG. 9. As described above, catch 75 includes a camming surface 77 to address this situation.

In principle, it is possible for gate 50 to be held or jammed open during the extension of servo arm 210. Catches 75, 75' would then return to a latched position as shown in FIG. 4 but without engaging followers 80, 80' because the latter would remain at an elevated position such as that shown in FIG. 8 on the toggle linkage. To ensure that the followers can become properly engaged when the jam is cleared, the strength of spring 130 should be more powerful than that of spring 116. Follower 80 can then force catch 75 backwardly (clockwise) as it returns.

In a test implementation of the foregoing embodiment, a dual hook was constructed having overall dimensions of about 31 cm in length, 30 cm in width and 44 cm in height, the latter including a flange 16 with a height of about 11 cm. The weight was about 55 kg. Loads as high as 13,600 kg were successfully engaged and released on each side (viz. hook 1, hook 2) of the dual hook.

Variations

While the foregoing embodiment of the invention is a preferred embodiment, it will be readily apparent to those skilled in the art that various modifications and changes are possible. By way of example, a variation which may be considered better suited for lighter loads is illustrated in FIGS. 18 and 19.

Figure 18:
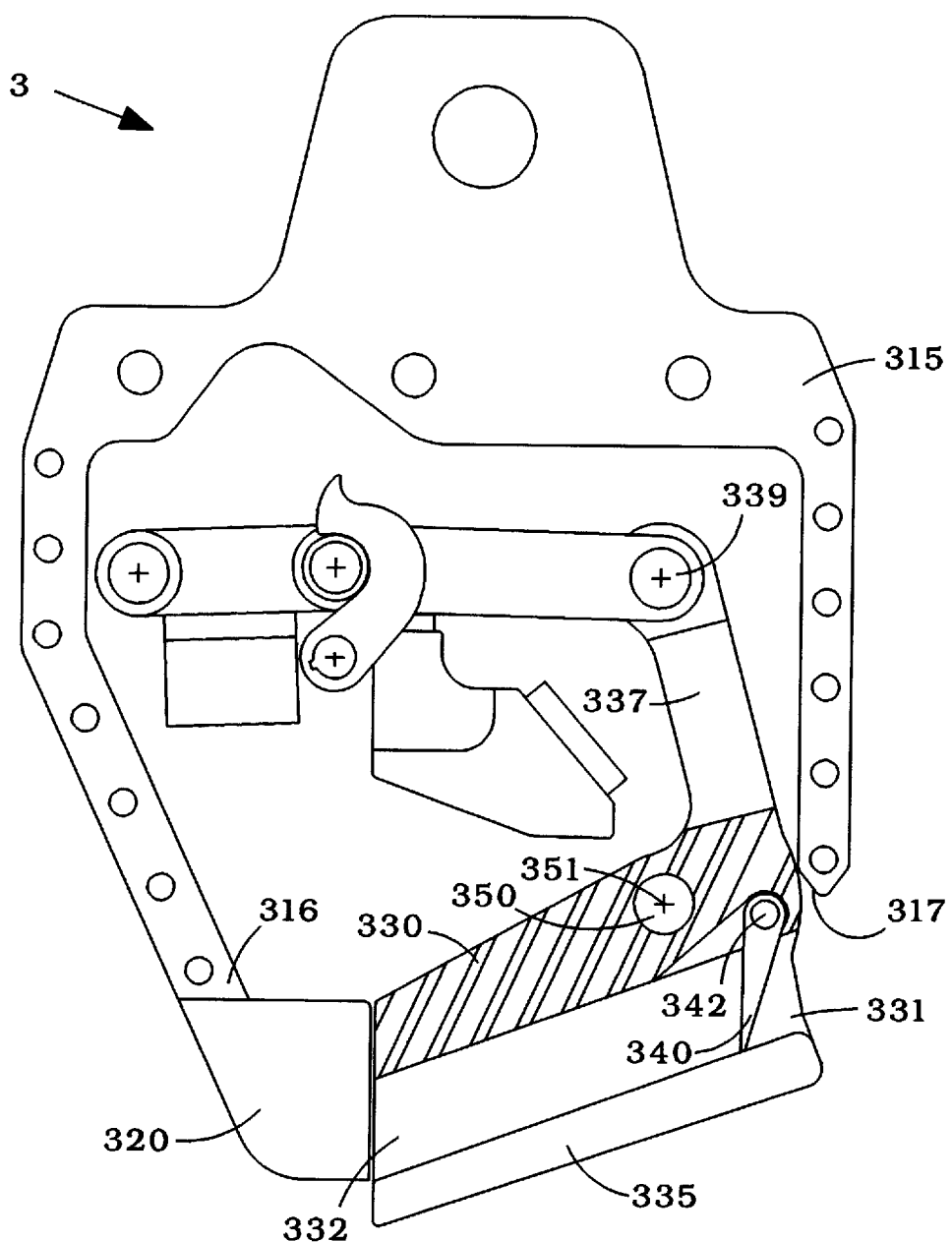
FIG. 18 is a side elevation view illustrating a portion of the operating mechanism of another cargo hook in accordance with the present invention when the mechanism is in position for receiving and carrying a load.
Figure 19:
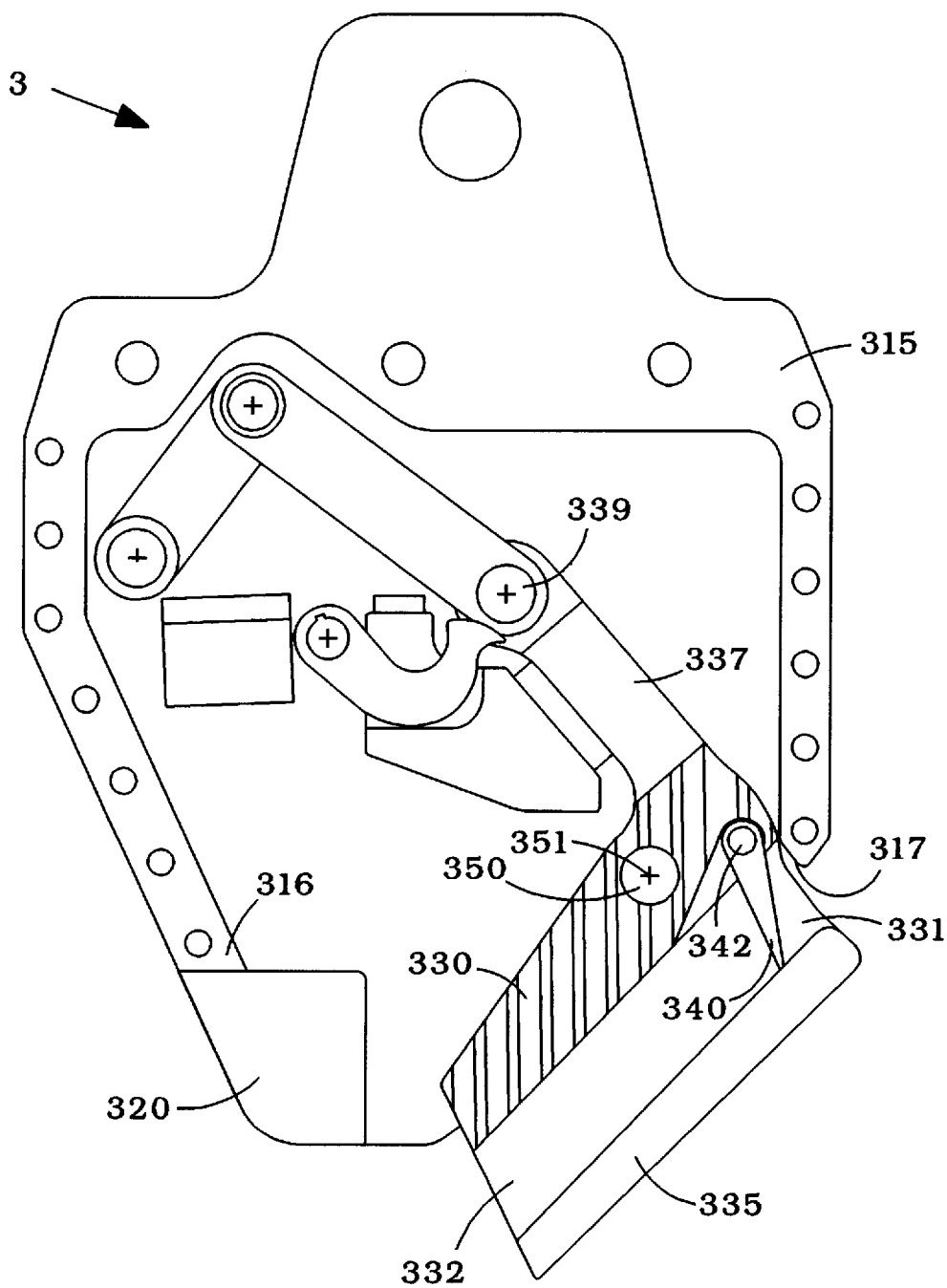
FIG. 19 is a side elevation view illustrating the portion of the operating mechanism shown in FIG. 18 when the mechanism is in position for releasing a load.

The major difference between the embodiment shown in FIGS. 18 and 19 and the embodiment shown in FIGS. 1 to 17 resides in the load support means. The former has a dynamic load beam 330 without a load release gate whereas the latter has a static load beam with a load release gate 50. Otherwise, the structure and operation of the two embodiments is very similar. For that reason, the following description is abbreviated and is substantially limited to a description of the structure and operation of the load support means. A detailed description of the latching means (only part of which is shown in FIGS. 18 and 19) is not included. Likewise, a detailed description of actuating means (which is not shown in FIGS. 18 and 19) is not included.

As in the case hook 1, cargo hook 3 shown in FIGS. 18 and 19 represents one side of a dual hook assembly. Hook 3 includes a spacer 315 and an outer plate (not shown) which correspond generally to spacer 15 and outer plate 10 of hook 1, but with some reconfiguration. More specifically, it will be noted that spacer 315 is configured at end 316 for the mounting of a stop 320. Further, it is configured at end 317 to accommodate rotation of load beam 330. The outer plate (not shown) of hook 3 is correspondingly reconfigured.

Stop 320 forms part of the load support means of hook 3. In effect, it performs part of the function of gate 50 of hook 1 in that it serves to prevent load cables from slipping off the beam. However, unlike gate 50, stop 320 is fixed and is not moved for the purpose of releasing a load.

Load beam 330 is pivotally mounted to the frame of hook 3 by means of dowel 350 which permits the beam to rotate about axis 351 between the closed position shown in FIG. 18 and the open position shown in FIG. 19. As can be seen, the beam extends from end 331 which is designed to receive the ferruled ends of load cables such as load cable 150 shown in FIG. 3 to end 332 which permits load release when the beam is in its open position. Also as can be seen, the beam embodies various attributes similar to ones found in the load beam of hook 1. This includes a pair of downwardly sloping rails, only one of which is shown (viz. rail 335). Further, this includes a keeper 340 mounted on a shaft 342 to provide basically the same function as keeper 45 of hook 1.

Unlike the load beam of hook 1 which has a split rail structure comprising rail structures 30 and 35, load beam 330 has an integrally formed structure which has been partially sectioned in FIGS. 18 and 19 to illustrate this point. Further, and again unlike the load beam of hook 1, load beam 330 includes an extension arm 337 which is pivotally connected to the toggle linkage of hook 3 by coupling pin 339. However, it will be readily understood that extension arm 337 of beam 330 provides a function similar to that of extension arm 53 on gate 50 of hook 1. The toggle linkage in hook 3 is basically the same as in hook 1. So too are the means for toggling the toggle linkage and the means for actuating the toggling means.

Although preferably limited to lighter loads, the use of cargo hook 3 is much the same as cargo hook 1. With load beam 330 in the position shown in FIG. 18, a rigger will introduce a load (e.g. logs) to the hook through end 331 with the use of one or more short line load cables. Typically, the ferruled ends of such cables will slide downwardly until they are stopped by stop 320 and the load will remain secured until the toggle linkage is unlatched thereby permitting the beam to drop or rotate from the position shown in FIG. 18 to the position shown in FIG. 19. The load then slips from the beam.

The limitation of hook 3 to use with lighter loads is considered desirable because substantial angular momentum may be generated in beam 330 by a heavier load upon load release.

It should be noted that load beam 330 and its rails need not have a downward slope as appears in the embodiment of FIGS. 18 and 19. For example, with suitable adjustments to overall geometry, the beam and its rails could extend horizontally. Note however that it would likely be undesirable to create a situation where the toggle linkage had to work to lift the load in order to achieve load release. An advantage of a downward slope as in the case of beam 330 is that the weight of the load will ensure a positive toggling action once the toggle linkage is permitted to toggle.

The load beams of both embodiments which have been described herein are particularly adapted for the handling of load cables such as load cable 150 in FIG. 2. But, the present invention is not limited to the handling of loads with such load cables or necessarily any load cables. Obviously, differing loads may be engaged in differing ways and many variations are possible in the design of load beams to accommodate differing types of loads. Examples would include a load beam which is particularly designed to engage a strap, or a chain, or hook, or some other type of coupling.

It is to be understood that various other modifications and changes can be made to the form, details, arrangement and proportion of the various parts described with reference to the foregoing embodiments without departing from the scope of the present invention. The invention is not to be construed as limited to the particular embodiments which have been described.

We claim:

1. A cargo hook for releasably carrying a load, said cargo hook comprising:

(a) a support frame;
(b) load support means carried by said frame, said load support means having a closed condition for securing said load and an open condition for permitting the release of said load;
(c) latching means for releasably latching said load support means in said closed condition, said latching means comprising:
  (i) a toggle linkage having a first end pivotally connected to said load support means, a second end pivotally connected to said frame, and an articulation joint between said ends;
  (ii) toggling means for toggling said toggle linkage between first and second toggle positions, said load support means alternating between said closed and open conditions as said toggle linkage toggles between said first and second toggle positions; and,
  (iii) catch means moveable between a latched position for holding said toggle linkage in said first toggle position and an unlatched position for permitting said toggle linkage to toggle between said first and second toggle positions.

2. A cargo hook as defined in claim 1, further including actuating means connected to said latching means for opening and closing said load support means.

3. A cargo hook as defined in claim 1, wherein said toggling means comprises:

(a) first and second lever members, each mounted for rotation about an associated lever axis;
(b) means connecting said first lever member to said catch means for rotating said catch means between said latched and unlatched positions in response to rotation of said first lever member about its said axis;
(c) means connecting said first lever member to said second lever member for rotating said second lever member in response to said rotation of said first lever member; and,
(d) means connecting said second lever member to said toggle linkage for toggling said toggle linkage between said first and second toggle positions in response to said rotation of said second lever member about its said axis.

4. A cargo hook as defined in claim 3, wherein said means connecting said first lever member to said second lever member comprises a spring.

5. A cargo hook as defined in claim 3, wherein said latching means includes a follower mounted at said articulation joint, said follower having an outwardly facing surface positioned for holding engagement by an inwardly facing surface of said catch means when said toggle linkage is in said first toggle position.

6. A cargo hook as defined in claim 5, wherein said catch means includes an outwardly facing curvate leading edge surface for camming said catch against said surface of said follower as said toggle linkage moves from said second toggle position to said first toggle position.

7. A cargo hook as defined in claim 3, including actuating means connected to said first lever member for rotating said first lever member about its said axis.

8. A cargo hook as defined in claim 7, wherein said actuating means comprises:

(a) a servo motor mounted to said frame; and,
(b) a linear movement servo arm which includes a distal end pivotally connected to said first lever member and which has extended and retracted positions controlled by said motor.

9. A cargo hook for releasably carrying a load, said cargo hook comprising:
   (a) a support frame;
   (b) a static load beam carried by said frame;
   (c) a load release gate pivotally mounted for rotation between a closed position securing said load on said beam and an open position permitting release of said load from said beam;
   (d) latching means for releasably latching said load release gate in said closed position, said latching means comprising:
      (i) a toggle linkage having a first end pivotally connected to said gate, a second end pivotally connected to said frame, and an articulation joint between said ends;
      (ii) toggling means for toggling said toggle linkage between first and second toggle positions, said gate alternating between said closed and open positions as said toggle linkage toggles between said first and second toggle positions; and,
      (iii) catch means moveable between a latched position for holding said toggle linkage in said first toggle position and an unlatched position for permitting said toggle linkage to toggle between said first and second toggle positions.

10. A cargo hook as defined in claim 9, further including actuating means connected to said latching means for opening and closing said gate.

11. A cargo hook as defined in claim 9, wherein said toggling means comprises:
   (a) first and second lever members, each mounted for rotation about an associated lever axis;
   (b) means connecting said first lever member to said catch means for rotating said catch means between said latched and unlatched positions in response to rotation of said first lever member about its said axis;
   (c) means connecting said first lever member to said second lever member for rotating said second lever member in response to said rotation of said first lever member; and,
   (d) means connecting said second lever member to said toggle linkage for toggling said toggle linkage between said first and second toggle positions in response to said rotation of said second lever member about its said axis.

12. A cargo hook as defined in claim 11, wherein said means connecting said first lever member to said second lever member comprises a spring.

13. A cargo hook as defined in claim 11, wherein said latching means includes a follower mounted at said articulation joint, said follower having an outwardly facing surface positioned for holding engagement by an inwardly facing surface of said catch means when said toggle linkage is in said first toggle position.

14. A cargo hook as defined in claim 13, wherein said catch includes an outwardly facing curvate leading edge surface for camming said catch against said surface of said follower as said toggle linkage moves from said second toggle position to said first toggle position.

15. A cargo hook as defined in claim 11, including actuating means connected to said first lever member for rotating said first lever member about its said axis.

16. A cargo hook as defined in claim 15, wherein said actuating means comprises:
   (a) a servo motor mounted to said frame; and,
   (b) a linear movement servo and which includes a distal end pivotally connected to said first lever member and which has extended and retracted positions controlled by said motor.

17. A cargo hook as defined in claim 9, wherein said load beam is sloped such that a load carried by said beam tends to slide towards and bear against said gate.

18. A cargo hook for releasably carrying a load, said cargo hook comprising:
   (a) a support frame;
   (b) a load beam pivotally mounted to said frame for rotation between a closed position securing said load on said beam and an open position permitting release of said load from said beam;
   (c) latching means for releasably latching said beam in said closed position, said latching means comprising:
      (i) a toggle linkage having a first end pivotally connected to said beam, a second end pivotally connected to said frame, and an articulation joint between said ends;
      (ii) toggling means for toggling said toggle linkage between first and second toggle positions, said beam alternating between said closed and open positions as said toggle linkage toggles between said first and second toggle positions; and,
      (iii) catch means moveable between a latched position for holding said toggle linkage in said first toggle position and an unlatched position for permitting said toggle linkage to toggle between said first and second toggle positions.

19. A cargo hook as defined in claim 18, further including actuating means connected to said latching means for opening and closing said beam.

20. A cargo hook as defined in claim 18, wherein said toggling means comprises:
   (a) first and second lever members, each mounted for rotation about an associated lever axis;
   (b) means connecting said first lever member to said catch means for rotating said catch means between said latched and unlatched positions in response to rotation of said first lever member about its said axis;
   (c) means connecting said first lever member to said second lever member for rotating said second lever member in response to said rotation of said first lever member; and,
   (d) means connecting said second lever member to said toggle linkage for toggling said toggle linkage between said first and second toggle positions in response to said rotation of said second lever member about its said axis.

21. A cargo hook as defined in claim 20, wherein said means connecting said first lever member to said second lever member comprises a spring.

22. A cargo hook as defined in claim 20, wherein said latching means includes a follower mounted at said articulation joint, said follower having an outwardly facing surface positioned for holding engagement by an inwardly facing surface of said catch means when said toggle linkage is in said first toggle position.

23. A cargo hook as defined in claim 22, wherein said catch includes an outwardly facing curvate leading edge surface for camming said catch against said surface of said follower as said toggle linkage moves from said second toggle position to said first toggle position.

24. A cargo hook as defined in claim 20, including actuating means connected to said first lever member for rotating said first lever member about its said axis.

25. A cargo hook as defined in claim 24, wherein said actuating means comprises:

(a) a servo motor mounted to said frame; and,
(b) a linear movement servo arm which includes a distal end pivotally connected to said first lever member and which has extended and retracted positions controlled by said motor.

* * * * *